United States Patent
Li (10) Patent No.: US 11,314,571 B2
(45) Date of Patent: *Apr. 26, 2022

(54) MULTI-PROCESSOR SYSTEM WITH DISTRIBUTED MAILBOX ARCHITECTURE AND COMMUNICATION METHOD THEREOF

(71) Applicant: Silicon Motion, Inc., Jhubei (TW)

(72) Inventor: An-Pang Li, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 31 days.

This patent is subject to a terminal disclaimer.

(21) Appl. No.: 16/398,280

(22) Filed: Apr. 30, 2019

(65) Prior Publication Data

US 2020/0065167 A1 Feb. 27, 2020

Related U.S. Application Data

(60) Provisional application No. 62/721,767, filed on Aug. 23, 2018.

(51) Int. Cl.
*G06F 7/06* (2006.01)
*G06F 11/07* (2006.01)
(Continued)

(52) U.S. Cl.
CPC ........ *G06F 11/0772* (2013.01); *G06F 3/0604* (2013.01); *G06F 3/0659* (2013.01);
(Continued)

(58) Field of Classification Search
CPC .. G06F 11/0772; G06F 3/0604; G06F 3/0659; G06F 3/0689; G06F 9/327;
(Continued)

(56) References Cited

U.S. PATENT DOCUMENTS 4,872,106 A * 10/1989 Slater ..................... G06F 11/14
714/13
5,142,683 A * 8/1992 Burkhardt, Jr. ......... G06F 15/17
709/215
(Continued)

FOREIGN PATENT DOCUMENTS

CN 102483705 A 5/2012
CN 103324599 A 9/2013
(Continued)

*Primary Examiner* — Doon Y Chow
*Assistant Examiner* — Abdou K Seye (57) ABSTRACT

A multi-processor system with a distributed mailbox architecture and a communication method thereof are provided. The multi-processor system comprises a plurality of processors, each of the processors is correspondingly configured with an exclusive mailbox and an exclusive channel, and the communication method comprises the following steps. When a first processor of the processors needs to communicate with a second processor, the first processor writes data into the exclusive mailbox of the second processor through a public bus; and when the writing of the data has completed, the exclusive mailbox of the second processor sends an interrupt signal to the second processor, after receiving the interrupt signal, the second processor reads the data in the exclusive mailbox through the corresponding exclusive channel.

10 Claims, 5 Drawing Sheets

(51) Int. Cl.
*G06F 9/32* (2018.01)
*G06F 13/16* (2006.01)
*G06F 11/20* (2006.01)
*G06F 9/48* (2006.01)
*G06F 9/54* (2006.01)
*G06F 13/24* (2006.01)
*G06F 3/06* (2006.01)
*G06F 11/10* (2006.01)

(52) U.S. Cl.
CPC ............ *G06F 3/0689* (2013.01); *G06F 9/327* (2013.01); *G06F 9/4812* (2013.01); *G06F 9/546* (2013.01); *G06F 11/1076* (2013.01); *G06F 11/2043* (2013.01); *G06F 13/1663* (2013.01); *G06F 13/1668* (2013.01); *G06F 13/24* (2013.01)

(58) Field of Classification Search
CPC .... G06F 9/4812; G06F 9/546; G06F 11/1076; G06F 11/2043; G06F 13/1663; G06F 13/1668; G06F 13/24
See application file for complete search history.

(56) References Cited

U.S. PATENT DOCUMENTS

| | | | |
|---|---|---|---|
| 6,735,173 B1* | 5/2004 | Lenoski | H04L 47/10 370/235 |
| 6,912,716 B1* | 6/2005 | Johanson | G06F 9/544 709/214 |
| 2003/0088626 A1* | 5/2003 | Gupta | G06F 15/16 709/206 |
| 2009/0313440 A1* | 12/2009 | Kim | G06F 9/544 711/149 |
| 2017/0010966 A1* | 1/2017 | Mittal | G06F 12/0842 |
| 2018/0364945 A1* | 12/2018 | Tseng | G06F 3/0683 |

FOREIGN PATENT DOCUMENTS

| | | |
|---|---|---|
| TW | 201237643 A1 | 9/2012 |
| TW | 201719446 A | 6/2017 |

* cited by examiner

MULTI-PROCESSOR SYSTEM WITH DISTRIBUTED MAILBOX ARCHITECTURE AND COMMUNICATION METHOD THEREOF

FIELD OF THE INVENTION

The present invention relates to a multi-processor system, and more particularly to a multi-processor system with a distributed mailbox architecture and a communication method thereof.

BACKGROUND OF THE INVENTION

Figure 1:
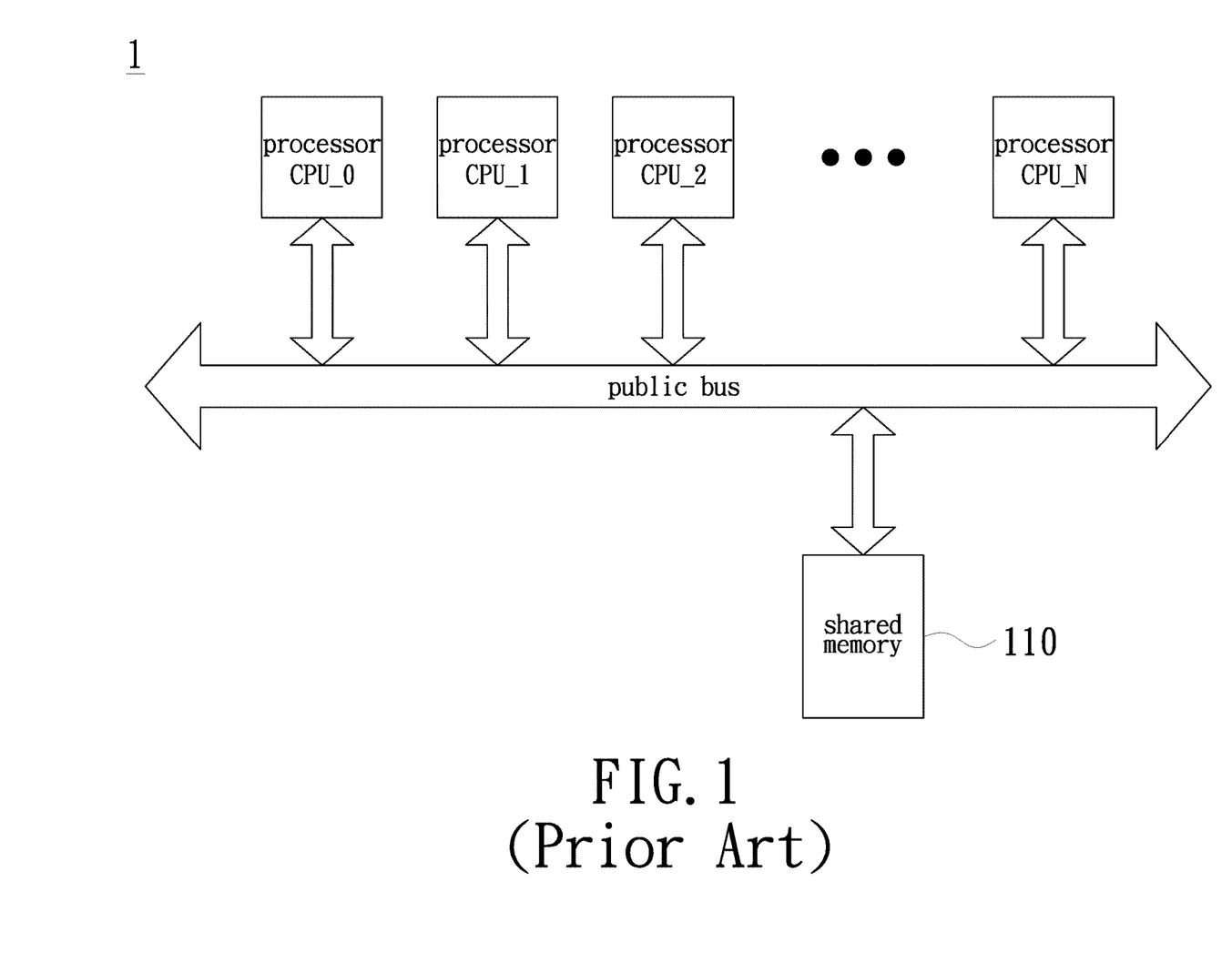
FIG. 1 is a functional block diagram of a conventional multi-processor system.

In conventional multi-processor systems, there is usually a shared memory used as a communication scheme. For example, please refer to FIG. 1, which is a functional block diagram of a conventional multi-processor system. A multi-processor system 1 comprises a shared memory 110 and a plurality of processors, such as processors CPU_0 to CPU_N. However, since the shared memory 110 and each of the processors are coupled to a same public bus, when there are more than one of the processors read and write the shared memory 110, the multi-processor system 1 needs to make a queue schedule of the public bus, resulting in the waiting of the public bus and degrading of the overall system performance.

SUMMARY OF THE INVENTION

In view of this, the embodiments of the present invention provide a multi-processor system with a distributed mailbox architecture and a communication method thereof. The multi-processor system comprises a plurality of processors, each of the processors is correspondingly configured with an exclusive mailbox and an exclusive channel, and the communication method comprises the following steps. When a first processor of the processors needs to communicate with a second processor, the first processor writes data into the exclusive mailbox of the second processor through a public bus; and when the writing of the data has completed, the exclusive mailbox of the second processor sends an interrupt signal to the second processor, after receiving the interrupt signal, the second processor reads the data in the exclusive mailbox through the corresponding exclusive channel.

In addition, the embodiments of the present invention further provide a processor error checking method. The processor error checking method can be similarly executed in the aforementioned multi-processor system, and comprises the following steps. When the first processor of the processors needs to communicate with the second processor, the first processor writes the data into the exclusive mailbox of the second processor through the public bus; and when the exclusive mailbox of the second processor receives the data, the exclusive mailbox of the second processor starts timing, and until the result of the timing exceeds a threshold value, the exclusive mailbox of the second processor sends a timeout signal to the second processor, and the second processor after receiving the timeout signal resets the first processor.

DETAILED DESCRIPTION OF PREFERRED EMBODIMENTS

In the following, the present invention will be described in detail by various embodiments with the accompanying figures. However, the concepts of the present invention may be embodied in many different forms and should not be construed as being limited to the illustrative embodiments set forth herein. In addition, the same reference numerals in the drawings may be used to represent similar elements.

Figure 2:
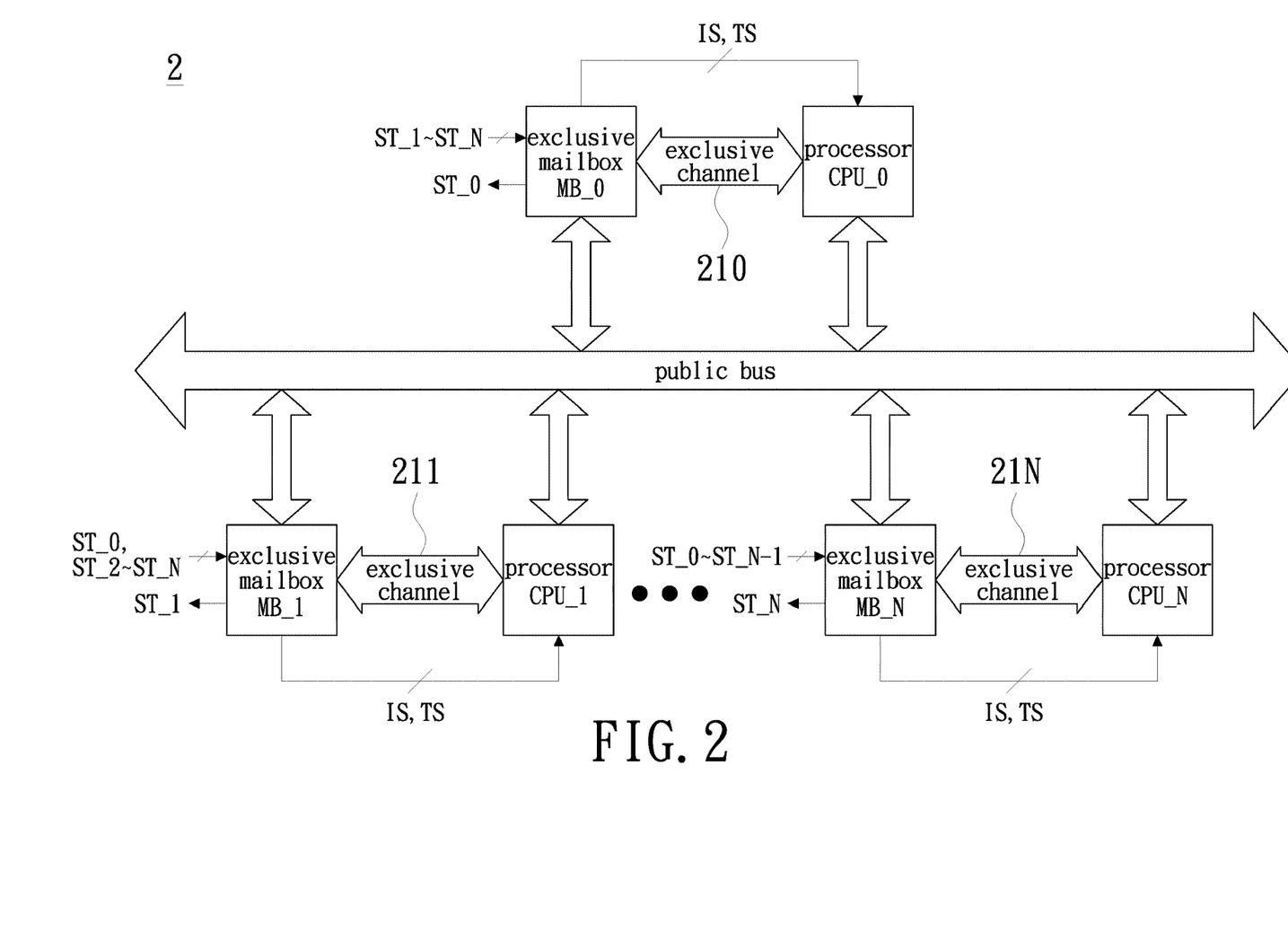
FIG. 2 is a functional block diagram of a multi-processor system with a distributed mailbox architecture according to an embodiment of the present invention.

Please refer to FIG. 2, which is a functional block diagram of a multi-processor system with a distributed mailbox architecture according to an embodiment of the present invention. As shown in FIG. 2, a multi-processor system 2 comprises a plurality of processors, and each of the processors is correspondingly configured with an exclusive mailbox and an exclusive channel. For example, a processor CPU_0 is configured with an exclusive mailbox MB_0 and an exclusive channel 210, a processor CPU_1 is configured with an exclusive mailbox MB_1 and an exclusive channel 211, and so on, and a processor CPU_N is configured with an exclusive mailbox MB_N and an exclusive channel 21N. It can be understood that the above mentioned N is any positive integer greater than 1, and each of the exclusive mailboxes can be composed of any storage medium, such as static random access memory (SRAM) or dynamic random access memory (DRAM), however, the present invention is not limited thereto.

As shown in FIG. 2, since all the processors and the exclusive mailboxes are coupled to a same public bus, in this embodiment, when the first processor of the processors, such as the processor CPU_0 writes data into the second processor, for example, the processor CPU_1, the first processor CPU_0 writes the data into the exclusive mailbox MB_1 of the second processor CPU_1 through the public bus, and the written data is read by the second processor CPU_1 from its exclusive mailbox MB_1, thereby communication between the multi-processors is done in this method. It should be explained that, before the first processor CPU_0 writes data into the exclusive mailbox MB_1 of the second processor CPU_1, the first processor CPU_0 preferably first confirms whether the exclusive mailbox MB_1 of the second processor CPU_1 has a sufficient storage space for storing the data, and if so, the first processor CPU_0 writes the data into the exclusive mailbox MB_1 of the second processor CPU_1 through the public bus, and when the writing of the data has completed, the exclusive mailbox MB_1 preferably sends an interrupt signal IS to the second processor CPU_1, or a register (not shown) of the second processor CPU_1 can be set to inform the second processor CPU_1 that the data is currently written into its exclusive mailbox MB_1. After receiving the interrupt signal IS or reading a value of the register, the second processor CPU_1 reads the data in its exclusive mailbox MB_1 through the corresponding exclusive channel 211, and then performs related processing on the data.

In other words, each of the processors is configured with the corresponding exclusive mailbox, instead of the processors sharing the same mailbox or memory, and therefore, the management procedure of storing data in the exclusive mailbox can be significantly simplified. Moreover, since each of the processors accesses the data in its exclusive mailbox through the corresponding exclusive channel, when each of the processors reads its exclusive mailbox, it does not need to be done via the public bus in the this embodiment, so that it does not occupy the resources of the public bus and can improve the overall system performance. In addition, when any one of the processors needs to write data into its exclusive mailbox, besides the processor can write data through the exclusive channel to avoid occupying the resources of the public bus, the processor can also write data into its exclusive mailbox through the public bus.

It should be noted that, since the multi-processor system 2 of this embodiment is preferably implemented by a data storage device, when a host (not shown) sends host commands to the multi-processor system 2, a front end (FE) processor of the multi-processor system 2, such as the processor CPU_0, is the first to process the host commands, such as obtaining the host commands from a transmission interface and sorting them, and then writing the processed host commands into a back end (BE) processor for communication, for example, into the exclusive mailbox MB_1 of the processor CPU_1, causing the processor CPU_1 to perform a specific function according to the host commands processed by the front end processor. That is to say, the above-mentioned "data" can refer to the host commands processed by the front end processor, or simply commands transmitted between the processors, but the present invention is not limited thereto.

Similarly, in this embodiment, each of the processors preferably performs data transmission on the public bus according to an advanced extensible interface (AXI) protocol, for example, when the first processor writes data into the exclusive mailboxes of the other processors, the public bus preferably has an arbiter (not shown) to handle the writing requests of all or most of the processors, and the writing request of the first processor is sequentially permitted according to the writing requests, the priority among the processors, or the order in which the writing requests are sent, and the sequence among the processors, etc. Therefore, the first processor after the writing request is permitted can write the data into the exclusive mailboxes of the other processors through the public bus, and the first processor whose writing request has not been permitted, can access the public bus only after the writing request is permitted.

Additionally, each of the processors preferably reads the data in its exclusive mailbox according to a self register protocol. For example, after data is written into the exclusive mailbox of the second processor, the exclusive mailbox sends the interrupt signal IS to the second processor. Then, the second processor can read the data in its exclusive mailbox according to the self register protocol, and after the data is read, the second processor can further inform its exclusive mailbox to delete or invalidate the data according to the self register protocol. In this way, the exclusive mailbox can reclaim the storage space occupied by the old data for storing new data. Correspondingly, in this embodiment, the first processor preferably writes one piece or a plurality of pieces of data into the exclusive mailbox of the second processor, and the second processor preferably reads one piece or a plurality of pieces of data from its exclusive mailbox, but the invention is not limited thereto.

In addition, in this embodiment, each of the exclusive mailboxes can further output a status signal to indicate whether it has a sufficient storage space to store data, and each of the exclusive mailboxes preferably receives the status signals outputted from the other exclusive mailboxes. For example, the exclusive mailbox MB_0 outputs a status signal ST_0, and the exclusive mailbox MB_0 receives status signals ST_1 to ST_N outputted from the exclusive mailbox MB_1 to the exclusive mailbox MB_N, respectively. Correspondingly, the exclusive mailbox MB_1 outputs the status signal ST_1, and the exclusive mailbox MB_1 receives the status signals ST_0 and ST_2 to ST_N respectively outputted from the exclusive mailbox MB_0 as well as the exclusive mailbox MB_2 to the exclusive mailbox MB_N, and so on; and the exclusive mailbox MB_N outputs the status signal ST_N, and the exclusive mailbox MB_N receives the status signal ST_0 to a status signal ST_N−1 outputted from the exclusive mailbox MB_0 to an exclusive mailbox MB_N−1, respectively. Therefore, when the first processor, for example, the processor CPU_0 needs to communicate with the second processor, such as the processor CPU_1, the first processor CPU_0 can confirm whether the exclusive mailbox MB_1 has a sufficient storage space to store the data according to the status signal ST_1 received by its exclusive mailbox MB_0. Or, in other embodiments, the status signals of all the exclusive mailboxes are preferably outputted to each of the processors, so that the first processor CPU_0 can directly determine whether to write data into the exclusive mailbox MB_1 according to the received status signal ST_1.

Figure 3A:
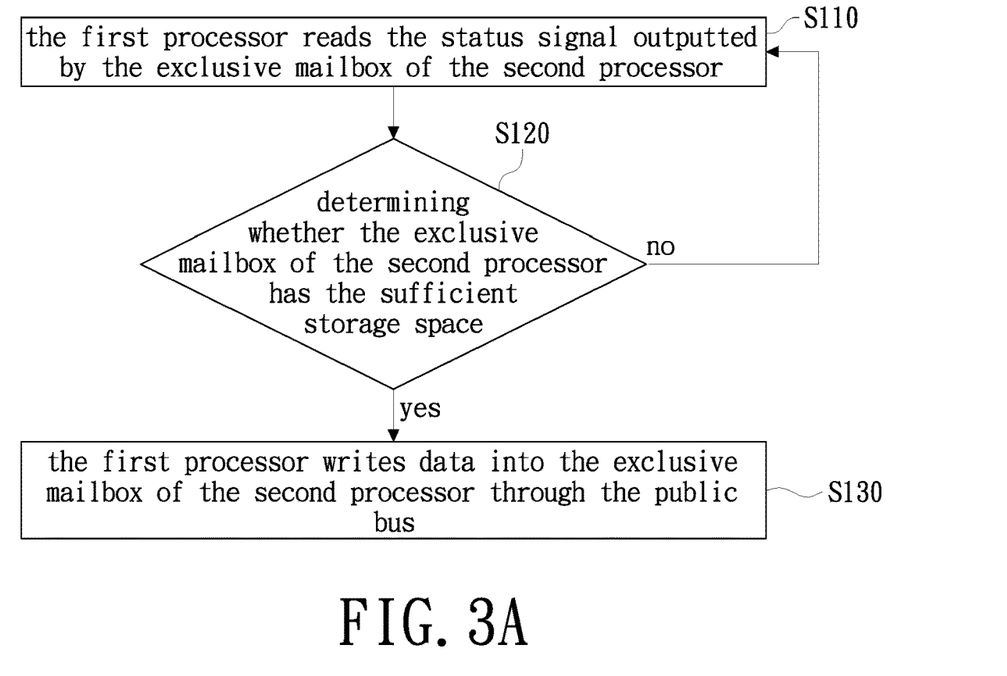
FIG. 3A is a flowchart related to a first processor in a communication method according to an embodiment of the present invention.
Figure 3B:
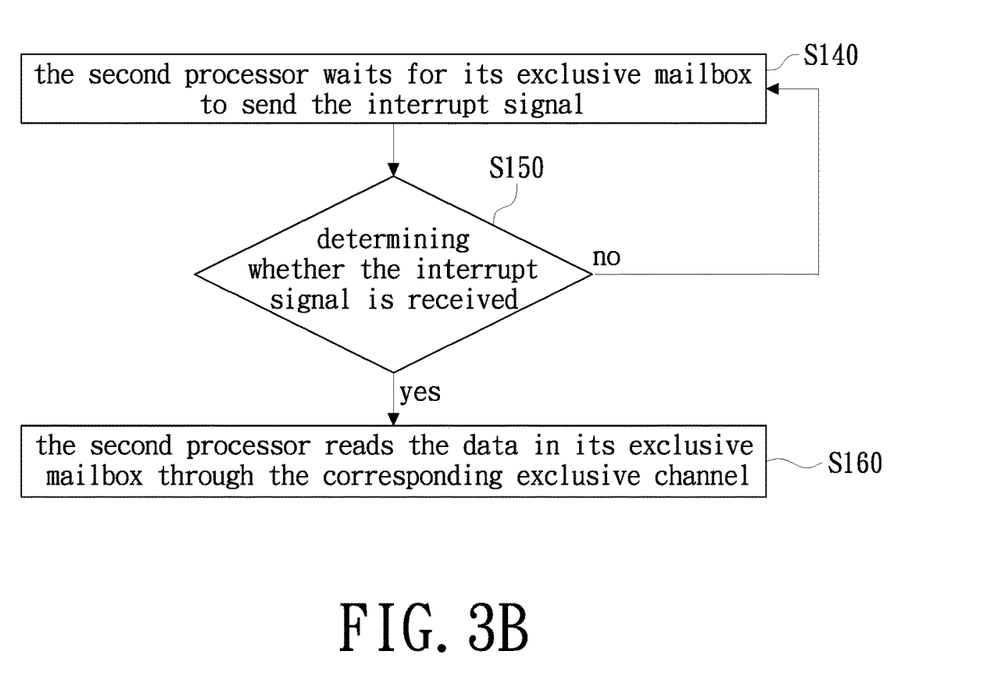
FIG. 3B is a flowchart related to a second processor in the communication method according to an embodiment of the present invention.

For example, each of the status signals is preferably implemented by a bit value, and when the bit value is 0, the exclusive mailbox represented by the status signal has sufficient storage space for storing data, and when the bit value is 1, the exclusive mailbox represented by the status signal does not have enough storage space for storing data, but the present invention is not limited thereto. Next, the way of implementation of the communication method of this embodiment will be further described with reference to FIG. 3A and FIG. 3B. FIG. 3A is a flowchart related to the first processor in the communication method according to the embodiment of the present invention; and FIG. 3B is a flowchart related to the second processor in the communication method according to the embodiment of the present invention. Since the details are also the same as described above, they will not be repeated herein again.

As shown in FIG. 3A, when the first processor, for example, the processor CPU_0 needs to communicate with the second processor, such as the processor CPU_1, in step S110, the first processor CPU_0 reading the status signal ST_1 outputted by the exclusive mailbox MB_1 from the exclusive mailbox MB_0, and in step S120, according to the status signal ST_1, determining whether the exclusive mailbox MB_1 having sufficient storage space for storing the data; if so, continuing to perform step S130; and if not, returning to perform step S110. That is, using the foregoing content as an example, before the exclusive mailbox MB_1 has enough storage space to store the data, that is, when the status signal ST_1 is 1, the first processor CPU_0 continues to perform a loop of steps S110 and S120, until it is determined that the state signal ST_1 is 0.

It should be explained that, in this embodiment, each of the exclusive mailboxes can preferably determine the status signal generated as 0 or 1 by checking whether its storage space is lower than a preset value, but the present invention is not limited thereto. In summary, the present invention does not limit the specific implementation of each of the exclusive mailboxes to generate or output the status signal, and those skilled in the art should be able to make related designs according to actual needs or applications. In addition, it should be understood that the content format in the exclusive mailbox is preferably defined by the firmware of the multi-processor system 2, so that this embodiment can easily change the content format of the data, thereby achieving an architecture that is easy to extend and flexible. Next, in step S130, the first processor CPU_0 writes the data into the exclusive mailbox MB_1 through the public bus, and when a writing of the data has completed, the exclusive mailbox MB_1 sends the interrupt signal IS to the second processor CPU_1.

In this embodiment, the interrupt signal IS is also preferably implemented by a bit value. For example, when the second processor CPU_1 receives and determines that the interrupt signal IS sent by the exclusive mailbox MB_1 is 1, the second processor CPU_1 can know that new data has been successfully written into its exclusive mailbox MB_1. Therefore, as shown in FIG. 3B, in step S140, the second processor CPU_1 waits for the exclusive mailbox MB_1 to send the interrupt signal IS, and in step S150, determines whether the interrupt signal IS is received; if so, continuing to perform step S160; and if not, returning to perform step S140. That is to say, using the foregoing content as an example, before the writing of the data is completed, that is, when the interrupt signal IS is not 1, the second processor CPU_1 continues to perform a loop of step S140 and step S150, until the interrupt signal IS of 1 is received. Finally, in step S160, the second processor CPU_1 reads the data in the exclusive mailbox MB_1 through the corresponding exclusive channel 211.

Figure 4:
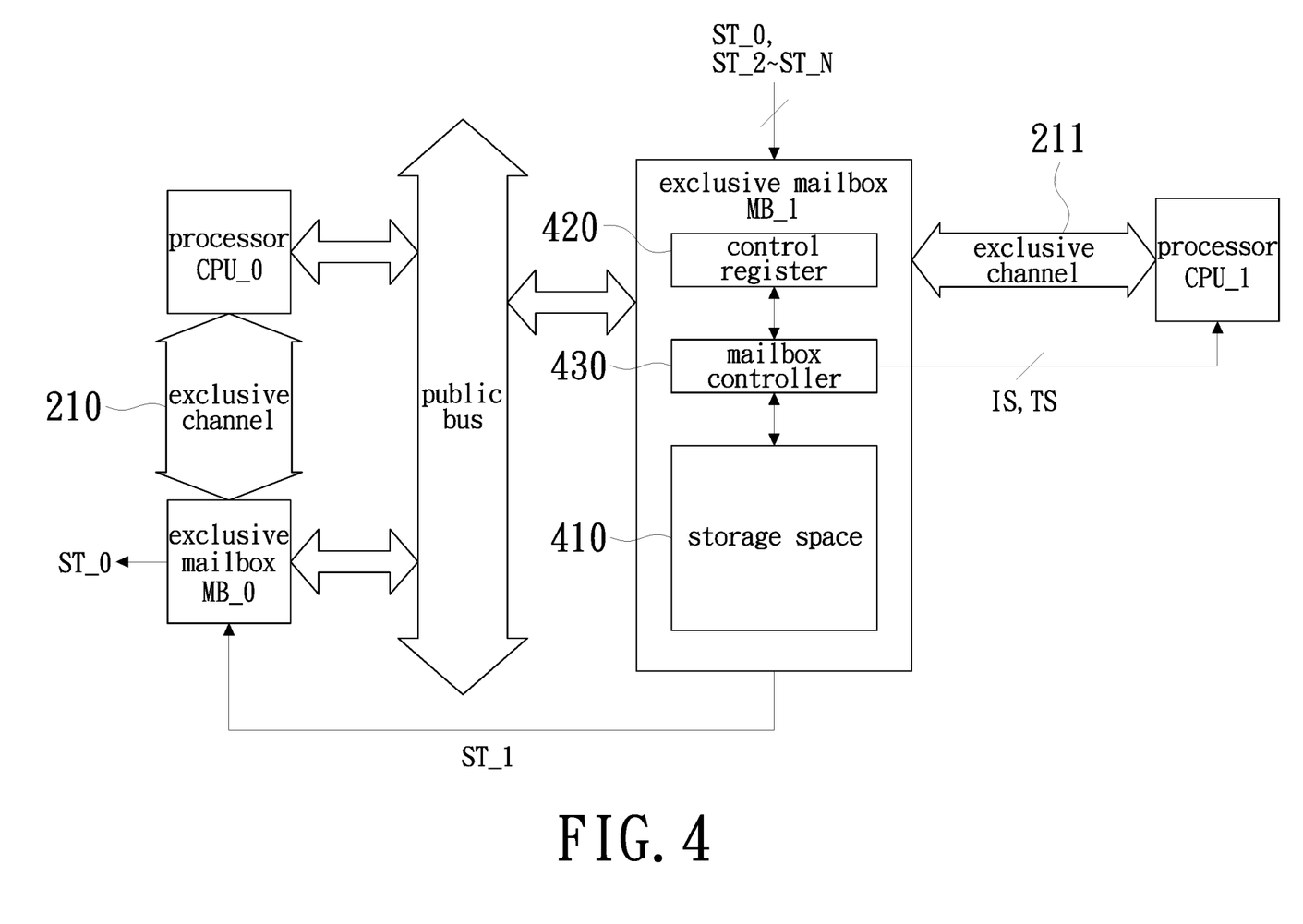
FIG. 4 is a functional block diagram of an exclusive mailbox in the multi-processor system of FIG. 2.

On the other hand, the present invention further provides another way of implementation of the exclusive mailbox. Please refer to FIG. 4, which is a functional block diagram of the exclusive mailbox in the multi-processor system of FIG. 2. It should be noted that, in order to facilitate the following description, this embodiment will be described by using only the exclusive mailbox MB_1 of the processor CPU_1 as an example, but it is not intended to limit the present invention. As shown in FIG. 4, the exclusive mailbox MB_1 comprises a storage space 410, a control register 420, and a mailbox controller 430. It should be noted that the above-mentioned control register 420 and mailbox controller 430 can be implemented by solely hardware circuits, or can be implemented by hardware circuits with firmware or software, but the present invention is not limited thereto. In addition, the above components can be integrated or separately disposed, but the present invention is not limited thereto. In summary, the present invention does not limit the specific implementation of the exclusive mailbox MB_1.

In this embodiment, the storage space 410 is preferably a SRAM, and the first-in-first-out (FIFO) queue is preferably used to store (temporarily) the data. A size of the storage space 410 is, for example, 1 KB. Under this setting, the storage space 410 can store 64 pieces of data of size 16 B, or 32 pieces of data of size 32 B, or 16 pieces of data of size 64 B. The control register 420 stores the relevant settings of the exclusive mailbox MB_1, for example, the control register 420 can be used to set an interrupt condition of the exclusive mailbox MB_1, and when the interrupt condition is satisfied, for example, when one or more than one pieces of data are successfully written into the mailbox MB_1, the mailbox MB_1 sends the interrupt signal IS to the processor CPU_1. In addition, the mailbox controller 430 is used to write set values into the control register 420, manage the storage space 410, and generate the interrupt signal IS and the status signal ST_1.

In this embodiment, the mailbox controller 430 preferably manages the size and the amount of data in the storage space 410 according to the settings of the processor CPU_1. If the size of the data is set to 64 B, when the remaining available space of the storage space 410 is less than or equal to a preset value, for example, 64 B (i.e. the storage space 410 can only store one more piece of data), the mailbox controller 430 generates the status signal ST_1 of 1. In this way, all the processors can no longer write data into the exclusive mailbox MB_1. Then, after the processor CPU_1 reads the data stored in the exclusive mailbox MB_1, the exclusive mailbox MB_1 reclaims the storage space of the read data, so that the remaining available space is increased to, for example, 128 B. At this time, since the remaining available space is larger than the preset value, the mailbox controller 430 generates the status signal ST_1 of 0, and when the status signal ST_1 is 0, the processor CPU_0 that needs to write data into the exclusive mailbox MB_1 can make a writing request to the public bus, and after the writing request is permitted, the processor CPU _0 can write data into the exclusive mailbox MB_1.

In other words, as shown in FIG. 4, when the processor CPU_0 needs to communicate with the processor CPU_1, the processor CPU_0 determines whether the exclusive mailbox MB_1 has the sufficient storage space 410 to store data according to the received status signal ST_1 outputted by the exclusive mailbox MB_1. If so, the processor CPU_0 writes data into the storage space 410 of the exclusive mailbox MB_1 through the public bus. Then, when the writing of data has completed, the mailbox controller 430 of the exclusive mailbox MB_1 generates and sends the interrupt signal IS to the processor CPU_1. The processor CPU_1 after receiving the interrupt signal IS accesses the data in the storage space 410 through the corresponding exclusive channel 211. Since the details are also the same as described above, they will not be repeated herein again.

On the other hand, besides using as a communication scheme between the different processors, the exclusive mailbox provided in this embodiment can also be used to check whether the processor that writes data has an error, and assist in resetting the processor with error, in order to prevent the processor from causing the entire multi-processor system 2 to be stuck. Therefore, please refer to FIG. 5, which is a flowchart of a processor error checking method according to the embodiment of the present invention. It should be explained that the processor error checking method of FIG. 5 can be executed in the multi-processor system 2 of FIG. 2, but the present invention does not limit the processor error checking method of FIG. 5 to only be able to execute in the multi-processor system 2 of FIG. 2. In addition, the steps in FIG. 5 which are the same as those in FIG. 4 are denoted by the same reference numerals, and thus the details thereof will not be described herein again.

Figure 5:
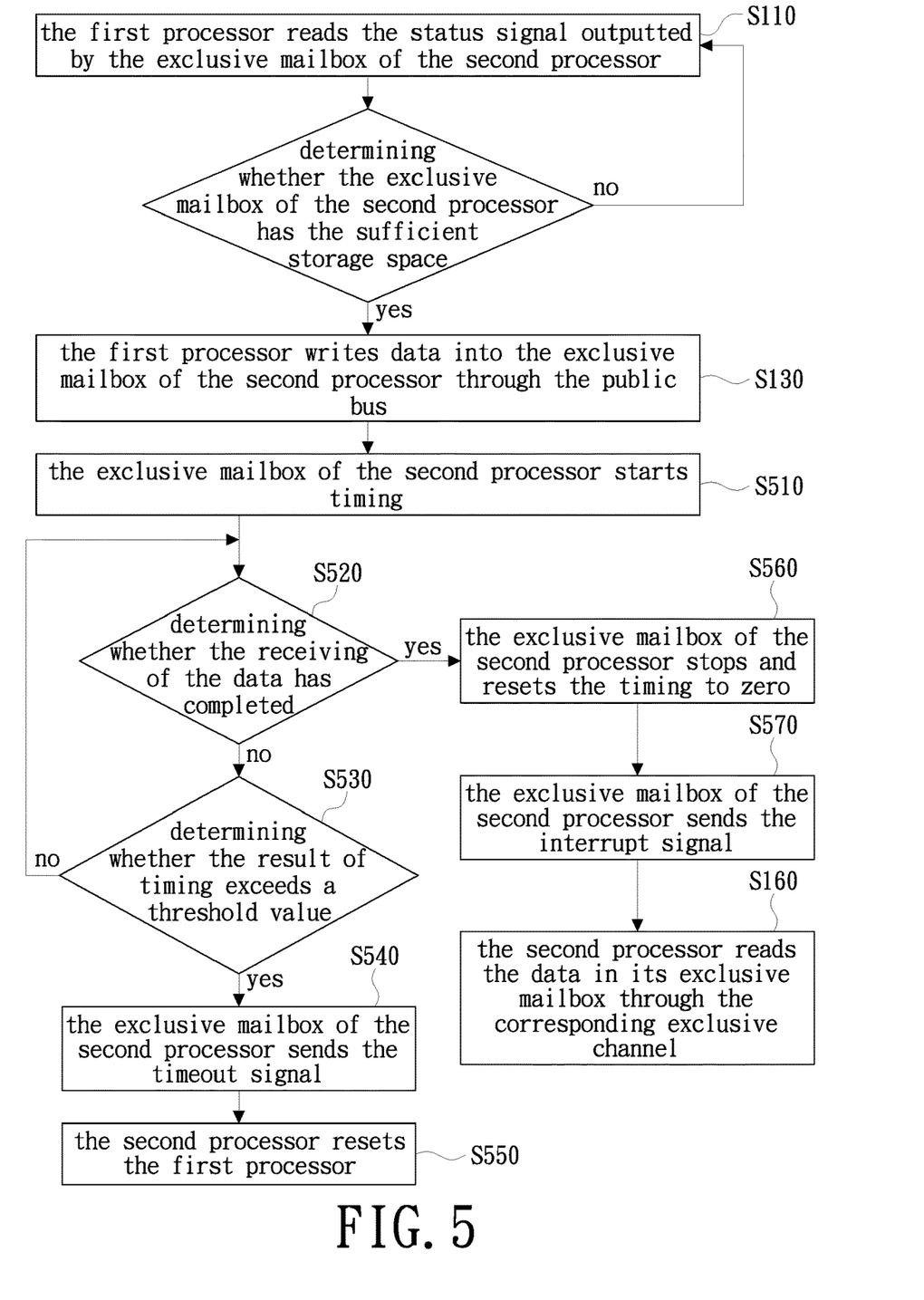
FIG. 5 is a flowchart of a processor error checking method according to an embodiment of the present invention.

As shown in FIG. 5, when the first processor, for example, the processor CPU_0 needs to communicate with the second processor, such as the processor CPU_1, in step S110, the first processor CPU_0 reads the status signal ST_1 outputted by the exclusive mailbox MB_1, and in step S120, determines whether the exclusive mailbox MB_1 has sufficient storage space to store data according to the status signal ST_1; if so, continuing to perform step S130; and if not, returning to perform step S110. Next, in step S130, the first processor CPU_0 writes the data into the exclusive mailbox MB_1 through the public bus, and when the exclusive mailbox MB_1 receives the data, in step S510, the exclusive mailbox MB_1 starts timing, and in step S520, determines whether the receiving of the data has completed, that is, determines whether the writing of the data has completed; if not, continuing to perform step S530. It should be noted that, since the operation principle of the exclusive mailbox MB_1 to determine whether the receiving of the data has completed according to the received data is known to those of ordinary skill in the art, the details of the above step S520 will not be described herein again.

Then, in step S530, the exclusive mailbox MB_1 of the second processor CPU_1 determines whether the result of the timing exceeds a threshold value; if not, returning to perform step S520; and if yes, continuing to perform step S540 and step S550. In step S540, the exclusive mailbox MB_1 sends a timeout signal TS to the second processor CPU_1 to inform the second processor CPU_1 that the first processor CPU_0 currently writing the data has an error, and in step S550, the second processor CPU_1 after receiving the timeout signal TS resets the first processor CPU_0. For example, the second processor CPU_1 preferably sends a reset signal (not shown) to the first processor CPU_0, so that the first processor CPU_0 can be reset according to the reset signal, but the present invention is not limited thereto.

That is, assume that the first processor CPU_0 needs to write 64 B of data into the exclusive mailbox MB_1, and after the exclusive mailbox MB_1 receives the data from the first processor CPU_0 and starts timing, if the first processor CPU_0 only writes 24 B of data and stops writing, this means the first processor CPU_0 may have an internal error, which causes the first processor CPU_0 to fail to complete the writing of data in time. Therefore, until the result of timing exceeds a threshold value, for example, 1000 milliseconds, the exclusive mailbox MB_1 generates the timeout signal TS to notify the second processor CPU_1, and according to the first processor CPU_0 indicated by the timeout signal TS, or according to information of the request side writing the data, the second processor CPU_1 determines the source of data is from the first processor CPU_0 in order to reset the first processor CPU_0. It should be explained that, since the settings of the timing and various types of determining functions are preferably implemented by the mailbox controller 430 writing the setting values into the control register 420, and the mailbox controller 430 is preferably controlled by the corresponding processor CPU_1; therefore, in addition to being used to generate and output the interrupt signal IS and the status signal ST_1, the mailbox controller 430 can also be used to generate and output the time-out signal TS.

On the other hand, in step S520, if the exclusive mailbox MB_1 determines to have received the data, that is, when the data is written into the exclusive mailbox MB_1, this embodiment continues to perform steps S560, S570, and S160. In step S560, the exclusive mailbox MB_1 stops and resets the timing to zero, and in step S570, the exclusive mailbox MB_1 sends the interrupt signal IS to the second processor CPU_1. Finally, in step S160, after receiving the interrupt signal IS, the second processor CPU_1 reads the data in the exclusive mailbox MB_1 through the corresponding exclusive channel 211. Since the details are also the same as described above, they will not be repeated herein again.

In summary, the multi-processor system with the distributed mailbox architecture and the communication method thereof provided by the embodiments of the present invention do not need to have a conventional shared memory, but are designed to have each of the processors equipped with the exclusive mailbox, so that communication between the different processors can be achieved by writing data into the exclusive mailbox of the mapping processor through the public bus. Since each of the processors accesses the data in the exclusive mailbox through the exclusive channel, when each of the processors reads the exclusive mailbox, the embodiments of the present invention will not affect the public bus, thereby reducing the usage rate of the public bus, and enhancing the overall system performance. In addition, the processor error checking method provided by the embodiments of the present invention can use the exclusive mailbox to check whether the processor that writes data has an error, and assist in resetting the processor with error, in order to prevent the processor from causing the entire multi-processor system to be stuck.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A multi-processor system with a distributed mailbox architecture, comprising:
   a plurality of processors, each of the processors being correspondingly configured with an exclusive mailbox and an exclusive channel, each processor being coupled to corresponding exclusive mailbox through an exclusive channel, the plurality of processors and the exclusive mailboxes of the plurality of processors being coupled to a public bus;
   wherein when a first processor of the processors needs to communicate with a second processor, the first processor writes data into the exclusive mailbox of the second processor through the public bus and the exclusive mailbox of the second processor starts timing;
   when a writing of the data has completed, the exclusive mailbox of the second processor resets the timing to zero and sends an interrupt signal to the second processor, after receiving the interrupt signal, the second processor reads the data in the exclusive mailbox of the second processor through the exclusive channel of the second processor;
   when the writing of the data has not completed, the exclusive mailbox of the second processor determines whether the timing exceeds a threshold value; and
   when the timing exceeds the threshold value, the exclusive mailbox of the second processor sends a timeout signal to the second processor, and the second processor sends a reset signal to the first processor.

2. The multi-processor system as claimed in claim 1, wherein when the first processor needs to communicate with the second processor, the first processor confirms whether the exclusive mailbox of the second processor has a sufficient storage space to store the data, if so, the first processor writes the data into the exclusive mailbox of the second processor through the public bus.

3. The multi-processor system as claimed in claim 2, wherein each of the exclusive mailboxes of the plurality of processors is further used to output a status signal to indicate whether it has the sufficient storage space to store the data, and each of the exclusive mailboxes of the plurality of processors receives the status signals outputted from the other exclusive mailboxes.

4. The multi-processor system as claimed in claim 3, wherein when the first processor confirms whether the exclusive mailbox of the second processor has the sufficient storage space to store the data, the first processor reads the status signal outputted by the exclusive mailbox of the second processor, and determines, according to the status signal, whether the exclusive mailbox of the second processor has the sufficient storage space to store the data.

5. The multi-processor system as claimed in claim 4, wherein each of the exclusive mailboxes of the plurality of processors further comprises:
a control register for setting an interrupt condition of the exclusive mailbox comprising the control register; and
a mailbox controller for managing the storage space as well as generating the interrupt signal and the status signal.

6. A communication method for executing in a multi-processor system, the multi-processor system comprising a plurality of processors, each of the processors being correspondingly configured with an exclusive mailbox and an exclusive channel, each processor being coupled to corresponding exclusive mailbox through an exclusive channel, the plurality of processors and the exclusive mailboxes of the plurality of processors being coupled to a public bus, and the communication method comprising the following steps of:
when a first processor of the processors needing to communicate with a second processor, the first processor writing data into the exclusive mailbox of the second processor through the public bus and the exclusive mailbox of the second processor starting timing;
when a writing of the data has completed, the exclusive mailbox of the second processor resetting the timing to zero and sending an interrupt signal to the second processor, after receiving the interrupt signal, the second processor reading the data in the exclusive mailbox of the second processor through the exclusive channel of the second processor;

when the writing of the data has not completed, the exclusive mailbox of the second processor determining whether the timing exceeds a threshold value; and when the timing exceeds the threshold value, the exclusive mailbox of the second processor sending a timeout signal to the second processor, and the second processor sending a reset signal to the first processor.

7. The communication method as claimed in claim 6, wherein when the first processor needs to communicate with the second processor, the first processor confirms whether the exclusive mailbox of the second processor has a sufficient storage space to store the data, if so, the first processor writes the data into the exclusive mailbox of the second processor through the public bus.

8. The communication method as claimed in claim 7, wherein each of the exclusive mailboxes of the plurality of processors is further used to output a status signal to indicate whether it has the sufficient storage space to store the data, and each of the exclusive mailboxes of the plurality of processors receives the status signals outputted from the other exclusive mailboxes.

9. The communication method as claimed in claim 8, wherein when the first processor confirms whether the exclusive mailbox of the second processor has the sufficient storage space to store the data, the first processor reads the status signal outputted by the exclusive mailbox of the second processor, and determines, according to the status signal, whether the exclusive mailbox of the second processor has the sufficient storage space to store the data.

10. The communication method as claimed in claim 9, wherein each of the exclusive mailboxes of the plurality of processors further comprises:
a control register for setting an interrupt condition of the exclusive mailbox of the plurality of processors; and
a mailbox controller for managing the storage space as well as generating the interrupt signal and the status signal.

* * * * *